United States Patent [19]
Bardy

[11] Patent Number: 6,050,528
[45] Date of Patent: Apr. 18, 2000

[54] ELECTRICAL CONTROL OR SIGNALING APPARATUS

[75] Inventor: Eric Bardy, Linars, France

[73] Assignee: Schneider Electric SA, Boulogne Billancourt, France

[21] Appl. No.: 09/108,117

[22] Filed: Jul. 1, 1998

[30] Foreign Application Priority Data

Jul. 2, 1997 [FR] France .................................. 97 08472

[51] Int. Cl.[7] .............................. G12B 9/00; B42F 13/00
[52] U.S. Cl. ......................... 248/27.1; 248/343; 248/906
[58] Field of Search .................................. 248/342, 343, 248/906, 27.1, 551; 362/147, 148, 150, 368, 366

[56] References Cited

U.S. PATENT DOCUMENTS

| | | | |
|---|---|---|---|
| 3,518,420 | 6/1970 | Kripp | 362/257 |
| 3,660,651 | 5/1972 | Miles, Jr. | 362/366 |
| 3,700,885 | 10/1972 | Bobrick | 362/366 |
| 4,232,361 | 11/1980 | Kelsall | 362/364 |
| 4,640,478 | 2/1987 | Leigh-Monstevens | 248/27.1 |
| 5,075,831 | 12/1991 | Stringer et al. | 362/365 |

*Primary Examiner*—Anita M. King
*Assistant Examiner*—David Heisey
*Attorney, Agent, or Firm*—Oblon, Spivak, McClelland, Maier & Neustadt, P.C.

[57] ABSTRACT

The present invention relates to an electrical control or signaling apparatus such as a push-button or indicator lamp consisting of a tubular body (12) which can be inserted into an aperture in a surface (13) and capable of fitting, using locking means (24), to a base (2) designed to receive at least one electrical unit (4) and comprising fastening means (3) acting on the inner side of the surface and characterized by the fact that the base (2) fits onto the tubular body (12) to which it is fastened by a sliding lock (24) and fastening means (3) consisting of a pivoting yoke (3) provided with two anchoring forks (33,34) mounted on hinges (35–221) to the base so that their free ends lie on either side of the movable section (25) of the lock (24), said yoke bearing a tightening screw (31).

20 Claims, 3 Drawing Sheets

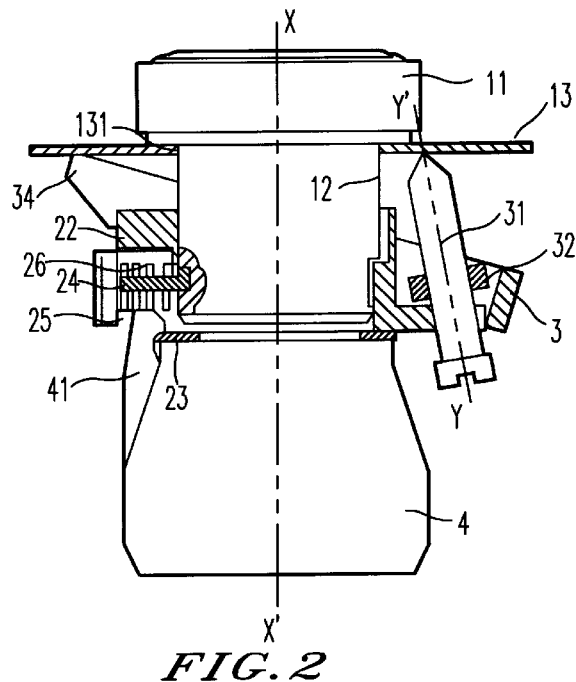
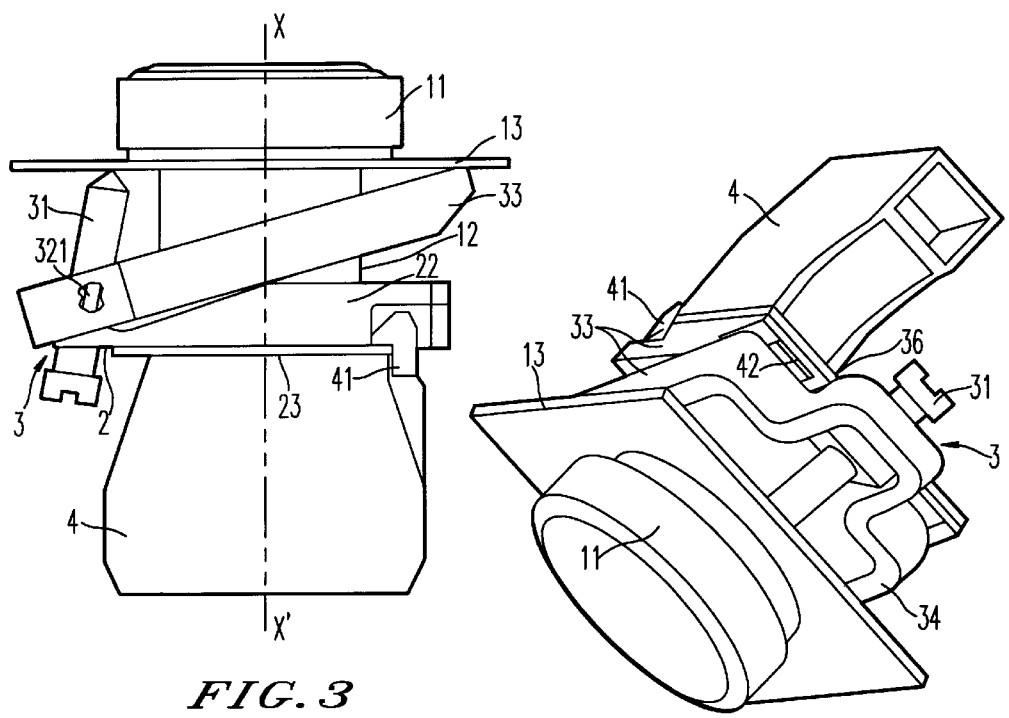

ELECTRICAL CONTROL OR SIGNALING APPARATUS

The present invention relates to an electrical control or signaling apparatus such as a push-button, indicator lamp, or similar component consisting of a tubular body which can be engaged in an aperture in a surface and capable of being fitted, using locking means, to a base designed to receive at least one electrical unit and comprising fastening means acting on the underside of the surface.

Said fastening means may consist of a nut screwed onto a thread of the tubular body of the apparatus.

Other fastening means consist of a base which is fitted onto the tubular body and bears contact units. The base bears hooking means such as locking screws or pivoting hooking arms operated by means of a screw, Such means are described in patent EP 452 462 or patent WO 91/07790.

The aim of the present invention is to provide fastening in which the gripping force is exerted in the axis of symmetry of the apparatus, providing the front panel with a good degree of leaktightness. The fastening exerts considerable force to hold the apparatus flush with the surface together with improved resistance to rotation.

According to the invention, the base fits onto the tubular body to which it is assembled by a sliding lock and fastening means consisting of a pivoting yoke provided with two anchoring forks mounted on hinges to the base in such a way that their free ends lie on either side of the outer section of the lock, said yoke bearing a tightening screw.

According to one characteristic, the yoke is more or less U-shaped.

According to another characteristic, the tightening screw screws into a hinge-mounted nut plate on the yoke and it is associated with means limiting its rotation clearance.

The invention will now be described in reference to embodiments given as examples and illustrated in the attached drawings in which:

FIG. 2 is an axial cross-section through the push-button of FIG. 1;

FIG. 3 is a top view of the push-button of FIGS. 1 and 2;

FIG. 4 is a perspective view of the push-button of FIGS. 1 to 3;

Figure 1:
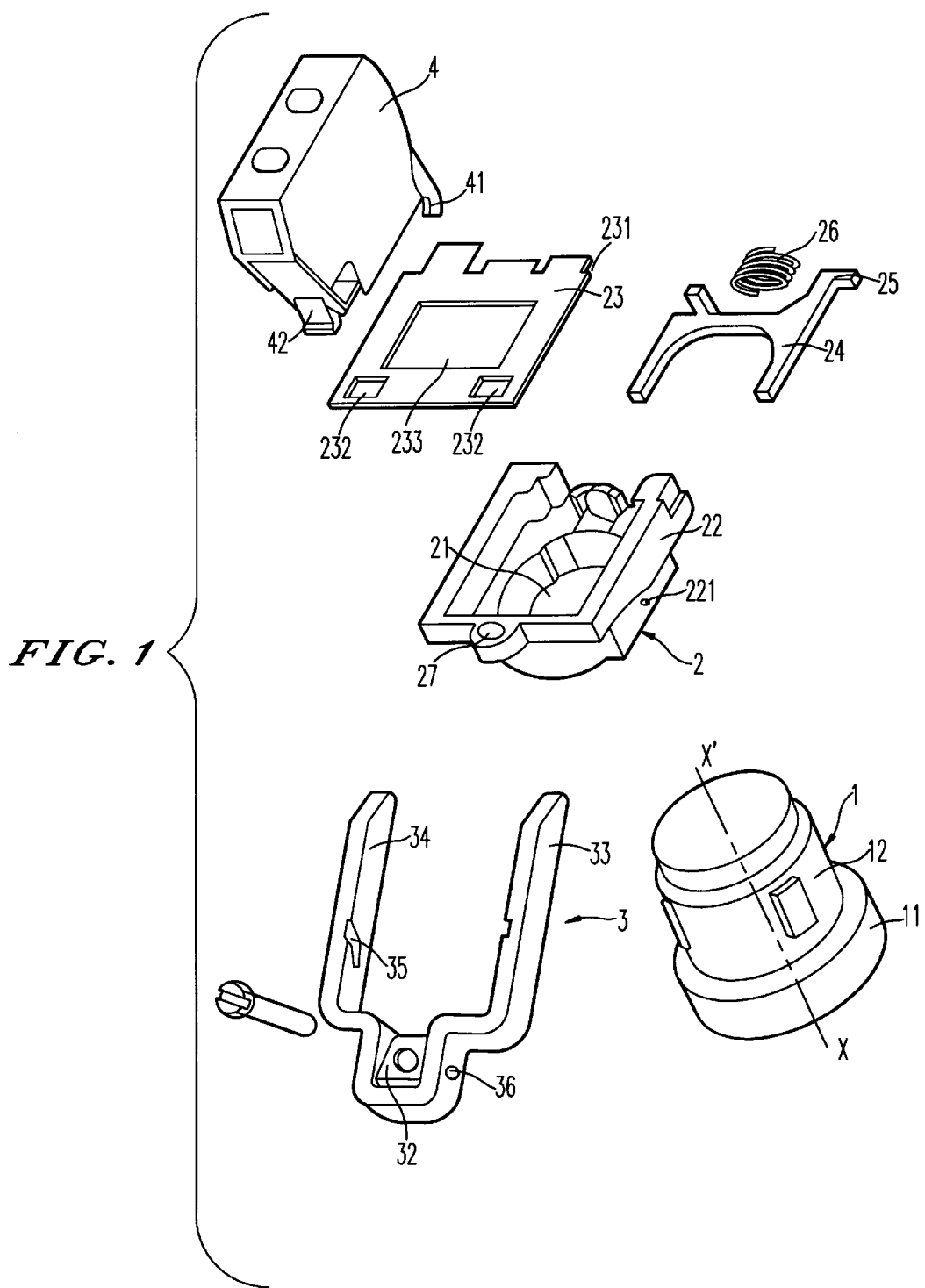
FIG. 1 is an exploded perspective view of a push-button according to the invention.

The electrical control or signaling apparatus illustrated in FIGS. 1 to 5 is a push-button comprising a body 1 consisting of a head 11 and a tubular section 12 that is more or less cylindrical in shape around axis XX' and with a diameter less than the width of the head. The apparatus is mounted on a thin support surface 13 so that the head, with possibly a seal and/or a label (not shown) on the outer surface of thin support surface 13, that may be part of an envelope such as a control panel, cabinet etc. The surface is pierced by a circular aperture 131 in which the tubular section 12 of the push-button is engaged.

The fastening of the push-button is achieved using a more or less rectangular-shaped fastening base 2. The base comprises a body 22 and a contact-bearing plate 23 fitted to the body by known means. The body 22 has a central bore 21 adapted to house the tubular section 12. The contact-bearing plate 23 is pierced by a central bore 233 and is used to bear detachable electrical units 4, such as contact switch units or auxiliary units, so that they can be detached and locked into place.

The base 2 fits on to the tubular section 12 and is assembled to the tubular part by a yoke-shaped sliding lock 24 that prevents the base from being detached in the axial direction. On the outside the lock has an operating finger 25. It is inserted into the sliders of the base 2 and it is subject to the force exerted by a locking spring 26 that tends to move it in the axis of symmetry X'–X'.

The base 2 is mounted on the inside of the surface 13. It is anchored against the inside of the surface 13 by means of a pivoting yoke 3 that is a U-shaped yoke and that bears a tightening screw 31 with a pointed end. The yoke consists of two anchoring forks 33 and 34 which are linked by a bridge 37.

In the embodiment of FIGS. 1 to 4, the tightening screw 31 is screwed into the nut-plate 32 which is mounted to pivot between anchoring forks 33 and 34. The tightening screw 31 is guided in the bore 27 of body 22. The nut-plate 32 is hinged on the yoke by a hinge 36. The rotation clearance of the nut-plate 32 is limited by stops provided in the hinge 36.

Figure 5:
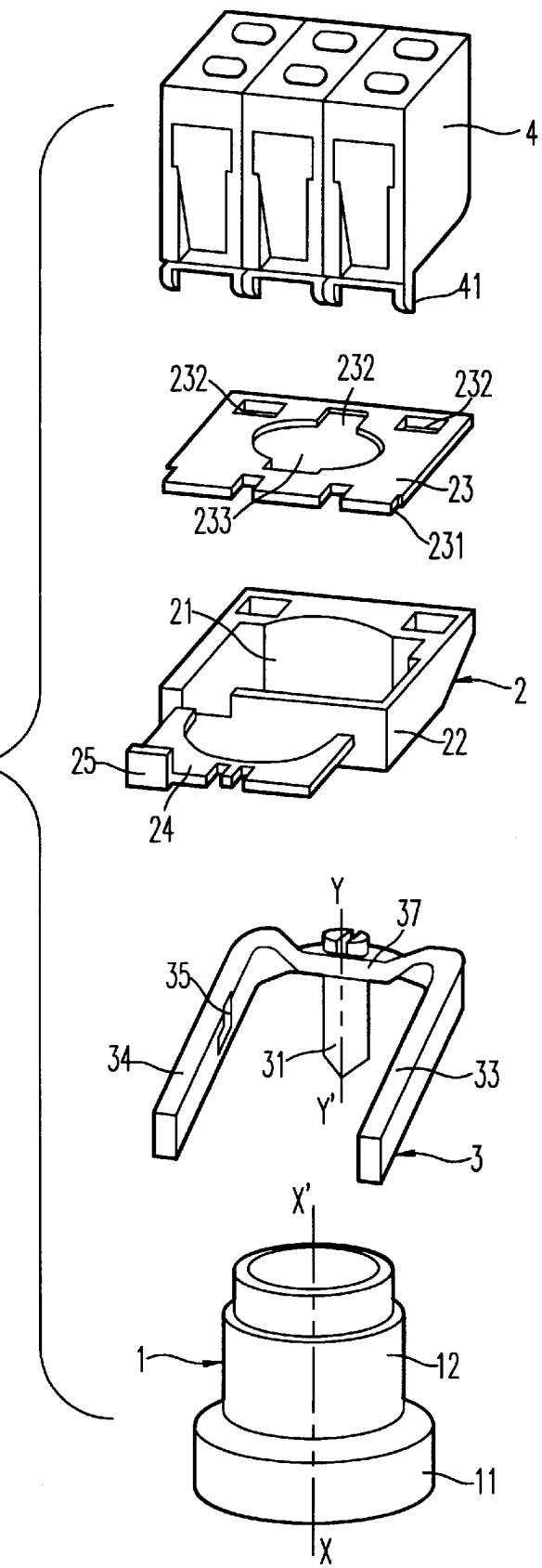
FIG. 5 is an exploded perspective view of a modification of FIG. 1.

In the modification of FIG. 5, the tightening screw 31 is screwed into a threaded hole which is provided in the bridge 37 fastening the two anchoring forks 33 and 34 to the yoke 3. The bridge 37 is twisted so that the axis of symmetry Y–Y' of the screw 31 form an acute angle with a plane parallel to the two anchoring forks 33 and 34.

The lateral forks of the yoke 3 are mounted on the outside of the base 2 to which they are hinged by hinged bearings 35 that are associated with spindles 221 constructed as part of body 22. The spindles 221 are perpendicular to and concurrent with the axis of symmetry X–X'. The sliding lock 24 is housed between the free ends of forks 33, 34 of the yoke so that access to the lock is easy when the units 4 are disassembled. Thus the pressure on surface 13 exerted by the free ends of forks 33 and 34 and the screw 31 bears on either side of the plane running through the axis X–X' and through the axles 35–221. As the hinging axles 35–221 are centered, the force on the push-button is exerted along axis X–X'.

The contact units 4 are fastened onto the contact-bearing plate 23, which is preferably metal. The units 4 are provided with movable hooking locks 41 which can be engaged in the slots 231 of the plate and also fixed hooking fingers 42 which hook into the slots 232 of the plate, the fingers and the locks 41 and 42 being positioned on either side of a plane running through X–X'.

The apparatus described above operates as follows:

The installer engages the tubular section 12 of the push-button in the aperture 131 of the surface 13, and then mounts base 2 onto the tubular section 12 until the sliding lock 24 locks into place. The yoke 3 is then brought into the gripping position shown in FIGS. 2 to 4 by rotating the screw 31. During this operation, the free ends of the two anchoring forks 33 and 34 of the yoke come to bear on the surface 13, while the pointed end of the screw 31 also comes to bear on the surface. Thus, there are three fastening points, which gives good gripping and resistance against rotation.

Modifications and improvements of detail, and even the use of similar means, can clearly also be envisaged while remaining in the context of the present invention.

I claim:

1. Electrical control apparatus comprising:
   a tubular body which can be engaged in an aperture in a surface;
   a base designed to receive at least one electrical unit and comprising fastening means for fastening the tubular body to the base by acting on the inner side of the surface; and
   a locking means for coupling the tubular body to the base, the locking means having a movable section;

wherein the fastening means comprises a pivoting yoke with two anchoring forks mounted on hinges to the base the forks having free ends which lie on either side of the movable section of the locking means, said yoke bearing a tightening screw, wherein the two anchoring forks and the tightening screw exert pressure on the surface.

2. Apparatus of claim 1, characterized by the fact that the yoke is more or less U-shaped.

3. Apparatus of claim 2, characterized by the fact that the tightening screw screws into a hinge-mounted nut plate on the yoke and it is associated with means that limit its rotation clearance.

4. Apparatus of claim 2, characterized by the fact that the tightening screw is mounted in such a way that its axes Y–Y' forms an acute angle with a plane parallel to the lateral forks of the U.

5. Apparatus of claim 2, characterized by the fact that the anchoring forks of the yoke are hinged to the base by hinged axles which are perpendicular and concurrent to the axis of symmetry X–X' of the tubular body.

6. Apparatus of claim 2, characterized by the fact that the lock has an operating finger, the operating finger being inserted into the base where the operating finger is subject to a spring lock that tends to move the operating finger in an axis of symmetry X–X'.

7. Apparatus of claim 2, characterized by the fact that the contact units are provided with movable hooking locks and fixed hooking fingers which hook into the base, the fingers and the locks and being positioned on either side of a plane running through X–X' of the apparatus.

8. Apparatus of claim 1, characterized by the fact that the tightening screw screws into a hinge-mounted nut plate on the yoke and it is associated with means that limit its rotation clearance.

9. Apparatus of claim 8, characterized by the fact that the tightening screw is mounted in such a way that its axes Y–Y' forms an acute angle with a plane parallel to the lateral forks of the U.

10. Apparatus of claim 8, characterized by the fact that the anchoring forks of the yoke are hinged to the base by hinged axles which are perpendicular and concurrent to the axis of symmetry X–X' of the tubular body.

11. Apparatus of claim 8, characterized by the fact that the lock has an operating finger, the operating finger being inserted into the base where the operating finger is subject to a spring lock that tends to move the operating finger in an axis of symmetry X–X'.

12. Apparatus of claim 8, characterized by the fact that the contact units are provided with movable hooking locks and fixed hooking fingers which hook into the base, the fingers and the locks and being positioned on either side of a plane running through X–X' of the apparatus.

13. Apparatus claim 1, characterized by the fact that the tightening screw is mounted in such a way that its axes Y–Y' forms an acute angle with a plane parallel to the lateral forks of the U.

14. Apparatus of claim 13, characterized by the fact that the anchoring forks of the yoke are hinged to the base by hinged axles which are perpendicular and concurrent to the axis of symmetry X–X' of the tubular body.

15. Apparatus of claim 13, characterized by the fact that the lock has an operating finger, the operating finger being inserted into the base where the operating finger is subject to a spring lock that tends to move the operating finger in an axis of symmetry X–X'.

16. Apparatus of claim 1, characterized by the fact that the anchoring forks of the yoke are hinged to the base by hinged axles which are perpendicular and concurrent to the axis of symmetry X–X' of the tubular body.

17. Apparatus of claim 16, characterized by the fact that the lock has an operating finger, the operating finger being inserted into the base where the operating finger is subject to a spring lock that tends to move the operating finger in an axis of symmetry X–X'.

18. Apparatus of claim 1, characterized by the fact that the locking means has an operating finger, the operating finger being inserted into the base where the operating finger is subject to a spring lock that tends to move the operating finger in an axis of symmetry X–X'.

19. Apparatus of claim 1, characterized by the fact that contact units are provided with movable hooking locks and fixed hooking fingers which hook into the base, the fingers and the locks and being positioned on either side of a plane running through X–X' of the apparatus.

20. Apparatus of claim 1, characterized by the fact that the base comprises a body and a plate.

* * * * *